United States Patent
Heisel et al.

(10) Patent No.: US 8,346,418 B2
(45) Date of Patent: Jan. 1, 2013

(54) METHOD OF SMOOTHING OUTPUT TORQUE

(75) Inventors: Adam J. Heisel, Garden City, MI (US); Christopher E. Whitney, Highland, MI (US); John L. Lahti, Novi, MI (US); Lan Wang, Troy, MI (US); Goro Tamai, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 510 days.

(21) Appl. No.: 12/627,184

(22) Filed: Nov. 30, 2009

(65) Prior Publication Data

US 2011/0130902 A1 Jun. 2, 2011

(51) Int. Cl.
*B60L 9/00* (2006.01)
(52) U.S. Cl. .......................................... 701/22
(58) Field of Classification Search .................. None
See application file for complete search history.

(56) References Cited

U.S. PATENT DOCUMENTS

| 6,769,403 | B2 | 8/2004 | Rayl et al. | |
| 7,757,666 | B2 * | 7/2010 | Whitney et al. | 123/481 |
| 2009/0118977 | A1 * | 5/2009 | Whitney et al. | 701/103 |
| 2011/0130902 | A1 * | 6/2011 | Heisel et al. | 701/22 |

* cited by examiner

*Primary Examiner* — Thomas Tarcza
*Assistant Examiner* — Adam Alharbi
(74) *Attorney, Agent, or Firm* — Quinn Law Group, PLLC

(57) ABSTRACT

A method of output torque smoothing for a hybrid powertrain having an electric machine and a spark ignition engine with a first cylinder and a second cylinder includes commanding a fuel-cut transition, including consecutively initiating and completing deactivation of the first cylinder and initiating and completing deactivation of the second cylinder. The fuel-cut transition is characterized by an absence of retarding spark to the first cylinder and second cylinder. Fuel is supplied to the first cylinder until the first cylinder completes deactivation and to the second cylinder until the second cylinder completes deactivation. The electric machine captures a first torque from the first cylinder by generating electricity until the first cylinder completes deactivation and captures a second torque from the second cylinder by generating electricity until the second cylinder completes deactivation.

10 Claims, 2 Drawing Sheets

METHOD OF SMOOTHING OUTPUT TORQUE

TECHNICAL FIELD

This disclosure relates to control of output torque from hybrid powertrains.

BACKGROUND OF THE INVENTION

Some internal combustion engines include engine control systems that deactivate cylinders under low load situations. This may be referred to as variable displacement. For example, an eight-cylinder engine may be operated using only four cylinders. It may be possible to obtain increased fuel efficiency if an engine can be operated on less than the full complement of cylinders during certain running conditions.

Hybrid powertrains may include an engine, an electric motor, and an electric generator. The engine may occasionally be shut down and traction provided by the electric motor or electric generator.

SUMMARY

A method of output torque smoothing for a hybrid powertrain is provided. The powertrain includes an electric machine and a spark ignition engine with a first cylinder and a second cylinder. The method includes commanding a fuel-cut transition, including consecutively initiating and completing deactivation of the first cylinder and initiating and completing deactivation of the second cylinder. The fuel-cut transition is characterized by an absence of retarding spark to the first cylinder and second cylinder.

Fuel is supplied to the first cylinder until the first cylinder completes deactivation and to the second cylinder until the second cylinder completes deactivation. The electric machine captures a first torque from the first cylinder by generating electricity until the first cylinder completes deactivation and captures a second torque from the second cylinder by generating electricity until the second cylinder completes deactivation.

The method may include maintaining substantially smooth torque output throughout the fuel-cut transition, such that an output torque profile of the hybrid transmission during the fuel-cut transition is characterized by the absence of inflection points. The method may further include timing spark ignition for the first and second cylinders to a blended spark advance, wherein the blended spark advance is between an optimal spark advance and a targeted spark advance. The targeted spark advance is the timing used for retarding spark to create a smooth output torque through spark retard alone. Then, the electric machine captures a first and a second excess torque from the first and second cylinders by generating electricity until the cylinders complete deactivation. The excess torque is equal to the difference between torque from the cylinders due to the blended spark advance and torque from the cylinders due to the targeted spark advance.

The above features and advantages and other features and advantages of the present invention are readily apparent from the following detailed description of the best modes and other embodiments for carrying out the invention when taken in connection with the accompanying drawings.

DESCRIPTION OF PREFERRED EMBODIMENTS

Figure 1:
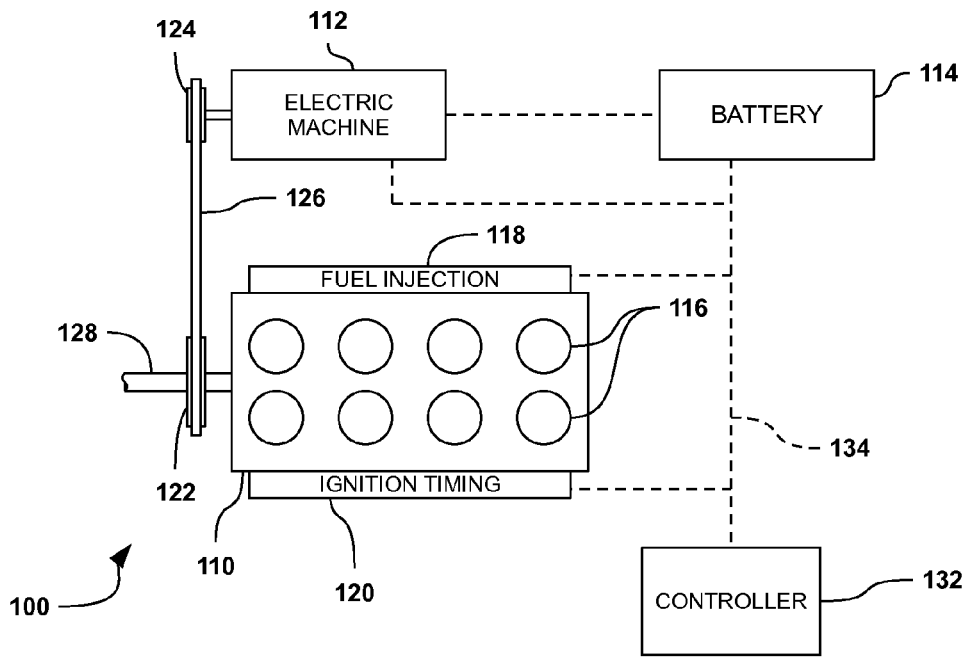
FIG. 1 is a schematic diagram of a powertrain.

Referring to the drawings, wherein like reference numbers correspond to like or similar components throughout the several figures, there is shown in FIG. 1 a schematic component diagram of a hybrid powertrain 100. The hybrid powertrain 100 shown in FIG. 1 is intended solely as an illustrative application into which the present invention may be incorporated. The claimed invention is not limited to the particular arrangement shown in the drawings. Furthermore, the hybrid powertrain 100 illustrated herein has been greatly simplified, as will be recognized by those having ordinary skill in the art.

While the present invention is described in detail with respect to automotive applications, those skilled in the art will recognize the broader applicability of the invention. Those having ordinary skill in the art will recognize that terms such as "above," "below," "upward," "downward," et cetera, are used descriptively of the figures, and do not represent limitations on the scope of the invention, as defined by the appended claims.

The hybrid powertrain 100 includes a spark ignition engine 110 and an electric machine 112, such as a motor/generator, a separate motor and generator, or another device capable of generating electricity from power supplied by the engine 110 or from capturing kinetic energy of the hybrid powertrain 100 through regenerative braking.

The engine 110 is readily adaptable to provide its available power to a transmission (not shown) at a range of operating speeds. The electric machine 112 is in electrical communication with a battery 114 configured to act as an energy storage device and may be a chemical battery. Additional electric machines 112 may be incorporated into the powertrain 100.

When acting as a generator, the electric machine 112 provides electricity that may be stored in the battery 114. When acting as a motor, the electric machine 112 may remove energy stored within the battery 114. An inverter (not shown) may be electrically connected to the electric machine 112 and battery 114 and allows conversion between direct current (DC) and alternating current (AC).

The engine 110 of powertrain 100 includes a plurality of cylinders 116. While the engine 110 is shown with eight cylinders 116, the claimed invention may utilize more or fewer cylinders 116, and is not limited to any specific configuration (V-shaped, inline, et cetera) of the cylinders 116.

The cylinders 116 are supplied with fuel for combustion by a fuel injection module 118, and combustion within the cylinders 116 is controlled by an ignition timing module 120. The fuel injection module 118 and ignition timing module 120 communicate with all of the cylinders 116 and may be configured to independently alter the combustion characteristics of individual cylinders 116 or groups of cylinders 116.

In the powertrain 100 shown in FIG. 1, power is transferred between the engine 110 and electric machine 112 via first and second pulleys 122, 124, which are connected by a belt 126. Other mechanisms may be utilized to transfer power between the engine 110 and the electric machine 112. For example, and without limitation, the engine 110 and electric machine 112 may be drivingly connected via gears, chains and sprockets, or directly connected by a shaft or sleeve shaft. Furthermore, one or more electric machines may be incorporated into the transmission such that an output shaft 128 connects the engine 110 and electric machine 112 without the use of the first and second pulleys 122, 124.

A controller 132 is in electrical communication with the remainder of the powertrain 100 via a control circuit 134. The controller 132 is configured to regulate the electrical power interchange between the battery 114 and the electric machine 112. Furthermore, the controller 132 regulates the fuel injection module 118 and the ignition timing module 120, thereby controlling combustion within each of the cylinders 116.

Figure 2:
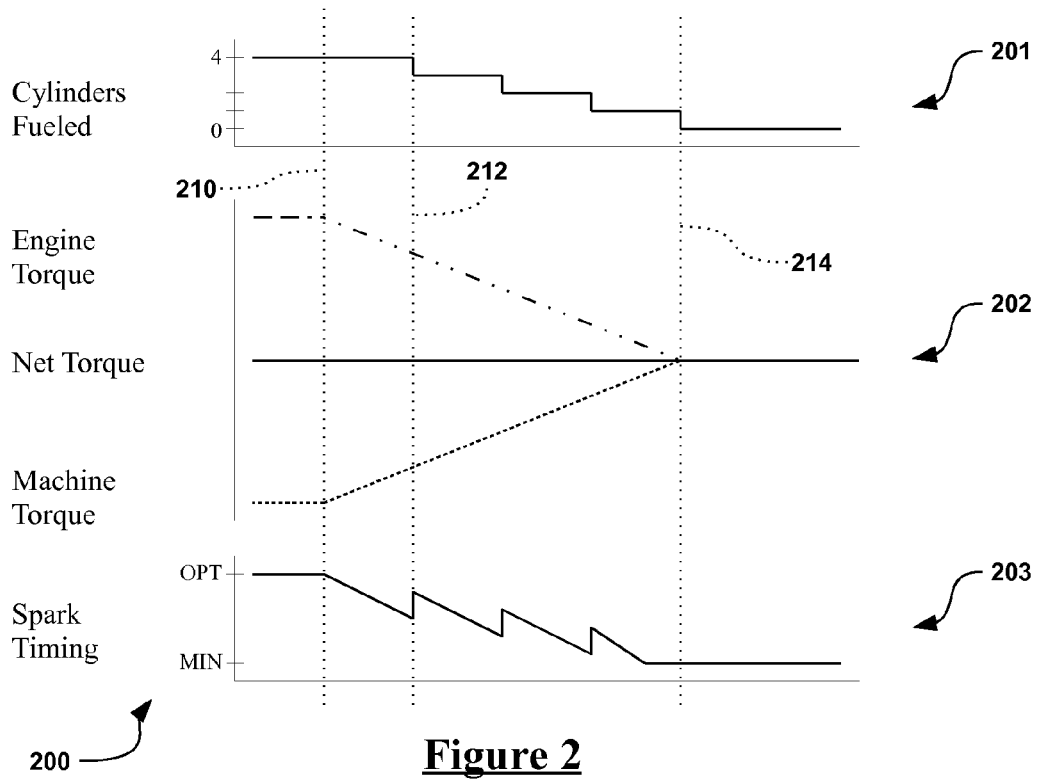
FIG. 2 is a schematic graph of a fuel-cut transition in four cylinders utilizing spark retard.
Figure 3:
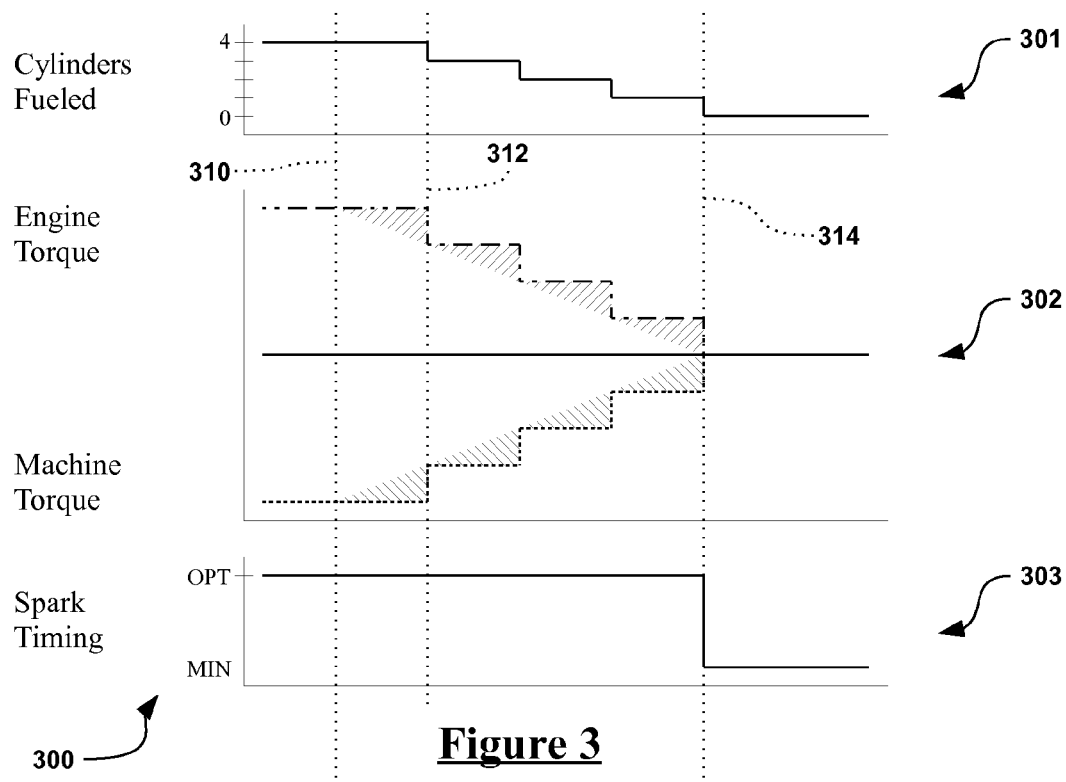
FIG. 3 is a schematic graph of a fuel-cut transition in four cylinders utilizing complete output torque capture.

Referring now to FIGS. 2 and 3, and with continued reference to FIG. 1, there are shown schematic graphs of operating characteristics of the powertrain 100 during highly-simplified fuel-cut transitions. FIG. 2 shows a first fuel-cut transition 200 utilizing spark retard to smooth the output torque from the engine 110 and FIG. 3 shows a second fuel-cut transition 300 utilizing output torque capture to smooth output torque in a more-efficient manner.

The powertrain 100 may be configured to allow some or all of the cylinders 116 of engine 110 to be deactivated. For example, in a powertrain 100 having an engine 110 having four total cylinders 116, all four cylinders 116 may be deactivated during hybrid operation while the electric machine 112 provides tractive torque to the wheels or during vehicle coasting, when the required output torque from the powertrain 100 may be low. As a further example, in the eight-cylinder engine 110 shown in FIG. 1, four of the cylinders 116 can be deactivated and engine 110 operated using only four cylinders 116. Additionally, the powertrain 100 may be configured to allow the engine 110 to turn off completely when the vehicle stops temporarily, such as at traffic signals or in stop-and-go traffic.

To smoothly transition the cylinders 116 between activated and deactivated modes, the powertrain 100 may be configured to produce output torque with a minimal of disturbances. With fewer torque disturbances, the transition will be less transparent to the driver. One way to quantitatively measure torque disturbances analyzes a graph or profile of the output torque or output speed from powertrain 100 for inflection points—points on a curve at which the curvature changes from convex to concave or vice versa—or abrupt (high rate) changes, including ninety-degree changes.

However, the engine 110 cannot activate or deactivate cylinders 116 instantaneously. For example, there may be a 1-3 crankshaft revolution delay between initiating deactivation of an individual cylinder 116 and completing deactivation. During the delay, fuel is still supplied to the cylinder 116. If this fuel is combusted, it produces torque from the cylinder 116, and the fuel may continue to be supplied for a short period of time after the controller 132 commands a cutoff to fuel for that cylinder 116.

One mechanism for smoothing output torque is adjusting ignition timing with a spark retard operation. By delaying (retarding) the spark to occur later than an optimal timing, maximum cylinder pressure will occur after the piston has already traveled too far down the cylinder 116. Spark retard results in lost power and torque from combusted fuel. The engine 110 has the optimal spark advance timing, for which each cylinder 116 produces its optimal (maximum) amount of torque, and a minimal spark advance timing, for which each cylinder 116 produces a minimal amount of torque, while still allowing the cylinder 116 to receive fuel. After each cylinder 116 completely deactivates, the controller 132 no longer ignites that cylinder 116 and the minimal spark advance timing is zero (or never).

Spark retard may utilize a targeted spark timing which is timed somewhere between the optimal and minimal and may fully move timing to the minimal level. Targeted spark timing is configured to produce smooth output torque via spark retard during the first fuel-cut transition 200 as each cylinder 116 initiates and completes deactivation.

FIG. 2 shows a highly-simplified application of spark retard during the first fuel-cut transition 200 that includes deactivation of four cylinders 116. Graph 201 shows the fueling schedule for the cylinders 116, as the controller 132 consecutively deactivates the four cylinders 116.

Graph 201 shows a first cylinder 116 being deactivated starting at line 210 and completing at line 212. The first cylinder 116 may be deactivated by a command to begin the first fuel-cut transition 200 from the controller 132. The controller 132 supplies fuel to the individual cylinder 116 until deactivation of that cylinder is complete. Completing deactivation of each cylinder 116 occurs as the individual cylinder 116 no longer produces output torque through combustion of fuel.

Second, third, and fourth cylinders 116 are the then consecutively deactivated thereafter. A line 214 shows the approximate completion time for the fourth, and final, deactivated cylinder 116. Graph 201 shows each cylinder 116 initiating and completing deactivation in approximately the same amount of time. However, the scheduling of the cylinders 116 need not be evenly-spaced, such that, for example, the last two cylinders 116 may remain active for longer than the first two cylinders 116. Note that the four cylinders 116 shown may be part of an eight-cylinder engine 110 (moving from eight to four-cylinder operation) or all of the cylinders 116 in a four-cylinder engine 110.

Graph 202 shows the output torque from the engine 110 and the output torque from the electric machine 112, which may be negative torque from generating electrical energy for storage in the battery 114. Graph 202 also shows the net output torque, which is constant in this example. The net output torque may be zero, such that any positive torque produced by the engine 110 is cancelled by negative torque from the electric machine 112.

During the first fuel-cut transition 200, the output torque (e.g. brake torque) of the engine 110 may be reduced to negative output torque as a result of friction and pumping loses with the fuel off, especially where all cylinders 116 are deactivated. The exemplary first fuel-cut transition 200 shown in FIG. 2 is configured to maintain constant net output torque from the powertrain 100, but may be similarly configured to smoothly maintain increasing, decreasing, or other non-zero net output torque levels.

Graph 203 shows the spark ignition timing for the cylinders 116, varying from optimal to minimal spark timing. As deactivation of the first cylinder 116 is initiated at line 210, the controller 132 begins to retard the spark timing to the cylinders 116. The path of graph 203 between lines 210 and 214 is the targeted spark timing, which is always less than optimal spark timing but greater than or equal to the minimal timing and eventually (as all of the cylinders 116 are deactivated) reaches the minimal timing.

The spark timing shown in graph 203 is the average or overall timing which results as the targeted spark timing for the individual cylinders 116 move from optimal to minimal spark timing, such that between lines 210 and 212 the effective spark timing for the first cylinder 116 decreases from optimal to minimal. By retarding the spark timing during cylinder deactivation, the torque produced by the engine 110 is decreased, as shown in graph 202, because the timing is no longer optimal.

During the first fuel-cut transition 200, while operating at the targeted spark timing, the engine 110 is able to produce smooth output torque as the first cylinder 116 initiates and then completes deactivation and the second cylinder 116 initiates deactivation as graph 202 moves from line 210 to line 212 and beyond. However, the targeted spark timing causes the engine 110 to combust fuel in a less-efficient manner than optimal spark advance, so the smooth output torque shown in graph 202 is achieved by purposefully producing torque at less-efficient rates.

Furthermore, if the electric machine 112 is operating to maintain the net torque at a constant value, the electric machine 112 needs to increase its torque output by drawing power from the battery 114 (or decrease the amount of energy produced through power generation by not charging the battery 114) in order to offset the loss of torque from engine 110. Therefore, the spark retard shown in FIG. 2 uses fuel less-efficiently in the engine 110 and also increases the relative amount of energy used by the electric machine 112.

FIG. 3 shows a highly-simplified application of output torque capture during the second fuel-cut transition 300 that also includes deactivation of four cylinders 116. Graph 301 shows the fueling schedule for the cylinders 116, as the controller 132 consecutively deactivates the four cylinders 116. The fueling schedules shown in graphs 201 and 301 are identical. Therefore, the amount of fuel used by the engine 110 is the same for either fuel-cut transition 200 or 300.

Graph 301 shows the first cylinder 116 being deactivated starting at line 310 and completing at line 312, in response to the controller 132 commanding the second fuel-cut transition 300. Each step on the graph 301 represents completion of deactivation of one cylinder 116 as fuel is no longer supplied to that cylinder 116. A line 314 shows the approximate completion time for the fourth, and final, deactivated cylinder 116. The steps of graph 301 may further represent the actual occurrence of torque change from the engine 110 due to the lack of combustion in the expansion stroke of the individual cylinder 116 being deactivated. The torque change may occur with a slight time delay between when fuel is delivered (or cut off) and when the power/expansion stroke of the cylinder 116 occurs. The spark is generally timed to happen at the same time as the power/expansion stroke.

Graph 302 shows the positive output torque from the engine 110 and the output torque from the electric machine 112, which may be negative torque from generating electrical energy for storage in the battery 114. Graph 302 also shows net output torque, which is again constant. The net output torque may be zero, such that any positive torque produced by the engine 110 is cancelled by negative torque from the electric machine 112. The exemplary second fuel-cut transition 300 shown in FIG. 3 is again configured to maintain constant net output torque from the powertrain 100, but may be similarly configured to smoothly maintain increasing, decreasing, or other non-zero net output torque levels.

Graph 303 shows the spark timing for the cylinders 116, varying from optimal to minimal spark timing. However, unlike the spark timing shown on graph 203 of FIG. 2, there is no spark retard used in this second fuel-cut transition 300. Therefore, the controller 132 and engine 110 maintain optimal spark timing until the second fuel-cut transition 300 completes and all four cylinders 116 are deactivated and no longer being supplied with fuel.

As deactivation of the first cylinder 116 is initiated at line 310, the controller 132 maintains optimal spark timing to the cylinders 116. As shown in graph 302, this results in stepped torque produced by the engine 110. This stepped torque would result in jolting or lurching which may be felt by the driver of the vehicle with which powertrain 100 is incorporated. In order to maintain smooth net output torque, as shown on graph 302, the controller 132 and electric machine 112 are configured such that the electric machine 112 captures an excess torque from the individual cylinders 116 between initiating and completing deactivation of each respective cylinder 116.

After the second fuel-cut transition 300 is commanded by the controller 132, deactivation of the first cylinder 116 is initiated at line 310 and completed at line 312. The controller 132 estimates the amount of torque generated between lines 310 and 312 (initiating and completing deactivation) by the first cylinder 116 if it is supplied with fuel and optimal spark timing is maintained. The controller 132 also controls electric machine 112 to generate power by producing negative torque approximately equal to the torque estimate for the first cylinder 116 during the deactivation process.

Comparing graph 202 to graph 302, both fuel-cut transitions 200 and 300 maintain consistent, smooth net output torque. However, the first fuel-cut transition 200 begins reducing the torque produced by engine 110 immediately at line 210, where the second fuel-cut transition 300 maintains output torque from the engine 110 until competing deactivation of the first cylinder 116 at line 312. Similarly, in order to maintain smooth output torque, the first fuel-cut transition 200 immediately begins to increase the relative torque produced by the electric machine 112—either by not generating power to charge the battery 114 or by increasing the amount of torque produced and draining the battery 114.

The shaded areas of graph 302 represent the amount of excess torque produced by the engine 110 and either captured or not generated by the electric machine 112 during the second fuel-cut transition 300 compared to the first fuel-cut transition 200. These shaded areas represent energy saved by capturing torque from engine 110 instead of utilizing spark retard (operating at targeted spark timing) to decrease output torque from the engine 110. The shaded areas (triangles) between lines 310 and 312 represent the captured energy during deactivation of the first cylinder 116, and the subsequent shaded areas represent the captured energy from deactivation of the second, third, and fourth cylinder 116, respectively.

The cylinder fueling schedules shown in graphs 201 and 301 are substantially identical, and the amount of fuel used during both the first fuel-cut transition 200 and the second fuel-cut transition 300 is also substantially identical. However, because optimal spark timing is maintained throughout the second fuel-cut transition 300, less net energy is used or more energy is stored in battery 114 during the second fuel-cut transition 300. Therefore, more energy is subsequently available for use in the powertrain 100 and the fuel economy of the vehicle may be improved of the economy cycle including the second fuel-cut transition 300 as opposed to the first fuel-cut transition 200.

The second fuel-cut transition 300 may further be applied to additional cylinders 116. For example, and without limitation, a six-cylinder engine 110 may be completely turned off by cutting fuel to all six cylinders 116. Furthermore, all eight of the cylinders 116 shown in FIG. 1 may be subject to second fuel-cut transition 300.

Figure 4:
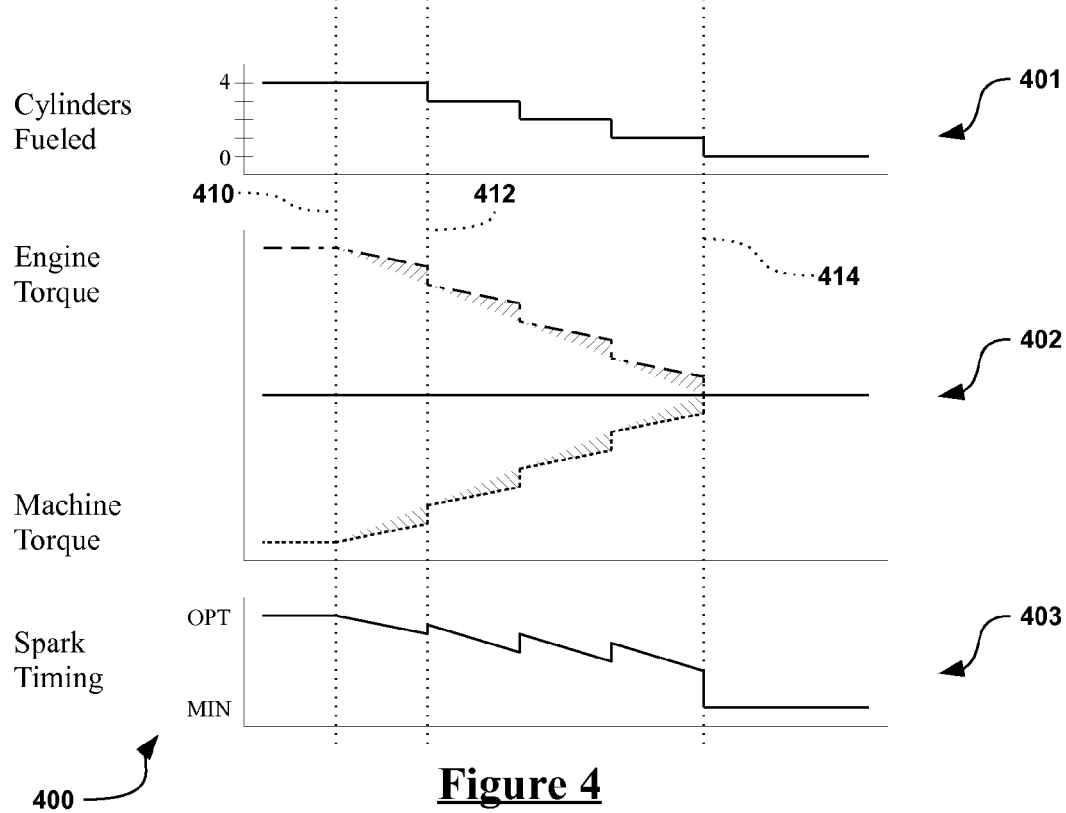
FIG. 4 is a schematic graph of a blended, or efficiency-ratio fuel-cut transition.

With reference to FIG. 4, and with continued reference to FIGS. 1-3, there is shown an efficiency-ratio fuel-cut transition 400, which is a further variation of the fuel-cut transition that combines elements of both the first fuel-cut transition

200 and the second fuel-cut transition 300. Graph 401 shows the fueling schedule for the cylinders 116, which is substantially identical to the fueling schedules shown in graphs 201 and 301. The first cylinder 116 begins deactivation at line 410 and completes at line 412. A line 414 again shows the approximate completion of the fourth, and final, deactivated cylinder 116. Therefore, the amount of fuel used by the engine 110 is the same for the efficiency-ratio fuel-cut transition 400 as either first or second fuel-cut transition 200 or 300.

For the efficiency-ratio fuel-cut transition 400, the controller 132 begins partially-retarding the spark timing of the first cylinder 116 to be deactivated, as shown on a graph 403. However, unlike the first fuel-cut transition 200—a pure spark retard transition in which advance is set to the targeted spark timing—the controller 132 commands operation at an efficiency ratio spark advance or a blended spark advance. The blended spark advance is less delayed from the optimal than what is needed to follow the smooth engine torque profile with spark retard alone, and is therefore between the optimal spark timing (shown on graph 302) and the targeted spark timing (shown on graph 202).

The controller 132 will estimate torque for engine 110 to reflect the fact that the blended spark advance uses less spark retard and the electric machine 112 can be used to capture a portion of the torque generated by the first cylinder 116 between initiating and completing deactivation of the first cylinder 116. The portion of torque captured is an excess torque, and is shown in the shaded portions of graph 402.

During the efficiency-ratio fuel-cut transition 400 the spark timing is not fully delayed to the targeted spark timing for each cylinder 116, such that the spark is not retarded to sufficiently follow a smooth torque profile during the deactivation process. Therefore, the electric machine is controlled to capture the excess torque, which is the difference between the torque produced by each cylinder 116 due to partial retarding of the spark timing (operating at the blended spark advance) and the torque that would be produced by delaying that cylinder to targeted spark timing, as in the first fuel-cut transition 200. The excess torque captured in efficiency-ratio fuel-cut transition 400 is less than that captured during the second fuel-cut transition 300, but does not waste as much energy as the full spark retard used in the first fuel-cut transition 200.

The same vehicle may use any of the fuel-cut transitions discussed herein (or other known to those having ordinary skill in the art). Implementation of the first fuel-cut transition 200, the second fuel-cut transition 300, and the efficiency-ratio fuel-cut transition may be determined by the controller 132 based upon multiple conditions. These conditions may be established to determine whether each fuel-cut transition is available, efficient, or pleasing to the driver. Conditions include, for example, and without limitation: the state of charge of the battery 114, the temperature of the battery 114 and electric machine 112, the amount of output torque requested by the driver, the stiffness of the driveline, and other conditions recognizable to those having ordinary skill in the art.

The powertrain 100 may be configured to further provide for a refuel transition. After the controller 132 completes one of the fuel-cut transitions described herein, the controller 132 may determine that the previously-deactivated cylinders 116 of engine 110 need to be refueled and reactivated. The refuel transition may be executed in a manner similar to, but generally reversed from, the fuel-cut transitions described herein. For illustrative purposes, a refuel transition which does not utilize spark retard is described.

The controller 132 commands the refuel transition, which includes consecutively initiating and completing reactivation of the first cylinder 116 and then initiating and completing reactivation of the second cylinder 116. The fuel-cut transition is characterized by an absence of retarding spark to the first cylinder 116 and second cylinder 116, such that maximum torque is generated by each of the cylinders 116 during reactivation.

The controller 132 begins supplying fuel to the first cylinder 116 as soon as the first cylinder 116 initiates reactivation and subsequently begins supplying fuel to the second cylinder 116 as soon as the second cylinder 116 initiates reactivation. While the first cylinder 116 is being reactivated, the electric machine captures output torque from the first cylinder 116 by generating electricity. The captured output torque from the first cylinder 116 would otherwise be lost by retarding the spark to the first cylinder 116 in order to smooth the output torque from the first cylinder 116 and engine 110. The controller similarly captures the torque generated by each of the subsequent cylinders 116 being reactivated.

While the best modes and other embodiments for carrying out the claimed invention have been described in detail, those familiar with the art to which this invention relates will recognize various alternative designs and embodiments for practicing the invention within the scope of the appended claims.

The invention claimed is:

1. A method of output torque smoothing for a hybrid powertrain having an electric machine and a spark ignition engine with a first cylinder and a second cylinder, comprising:
    commanding a fuel-cut transition, including consecutively initiating and completing deactivation of the first cylinder and initiating and completing deactivation of the second cylinder, wherein the fuel-cut transition is characterized by an absence of retarding spark to the first cylinder and second cylinder;
    supplying fuel to the first cylinder until the first cylinder completes deactivation;
    supplying fuel to the second cylinder until the second cylinder completes deactivation;
    capturing a first torque from the first cylinder by generating electricity with the electric machine until the first cylinder completes deactivation; and
    capturing a second torque from the second cylinder by generating electricity with the electric machine until the second cylinder completes deactivation.

2. The method of claim 1, further comprising maintaining optimum spark advance timing during said fuel-cut transition, wherein the captured first torque occurs as a result of combusting the fuel supplied to the first cylinder due to the optimum spark advance timing, and the captured second torque occurs as a result of combusting the fuel supplied to the second cylinder due to the optimum spark advance timing.

3. The method of claim 2, wherein the spark ignition engine further includes a third cylinder and a fourth cylinder, and further comprising:
    wherein the fuel-cut transition further includes consecutively initiating and completing deactivation of the third cylinder and then initiating and completing deactivation of the fourth cylinder, and wherein the fuel-cut transition is characterized by an absence of retarding spark to the third cylinder and fourth cylinder;
    supplying fuel to the third cylinder until the third cylinder completes deactivation;
    supplying fuel to the fourth cylinder until the fourth cylinder completes deactivation;

capturing a third torque from the third cylinder by generating electricity with the electric machine until the third cylinder completes deactivation; and capturing a fourth torque from the fourth cylinder by generating electricity with the electric machine until the fourth cylinder completes deactivation.

4. The method of claim 3, wherein maintaining optimum spark advance timing includes maintaining maximum torque output from the first, second, third, and fourth cylinders during the fuel-cut transition.

5. The method of claim 4, further including maintaining substantially smooth torque output throughout the fuel-cut transition, such that an output torque profile of the hybrid transmission during the fuel-cut transition is characterized by the absence of inflection points.

6. The method of claim 5, further comprising:
commanding a refuel transition, wherein the refuel transition includes consecutively initiating and completing reactivation of the first cylinder and then initiating and completing reactivation of the second cylinder, and wherein the fuel-cut transition is characterized by an absence of retarding spark to the first cylinder and second cylinder;
supplying fuel to the first cylinder as soon as the first cylinder initiates reactivation;
supplying fuel to the second cylinder as soon as the second cylinder initiates reactivation;
capturing a fifth torque from the first cylinder by generating electricity with the electric machine during reactivation the first cylinder; and
capturing a sixth torque from the second cylinder by generating electricity with the electric machine during reactivation of the second cylinder.

7. The method of claim 6, wherein the spark ignition engine further includes a fifth cylinder and a sixth cylinder:
supplying fuel to the fifth and sixth cylinders during the fuel-cut transition, wherein the fifth and sixth cylinders remain fully active during the fuel-cut transition; and
supplying fuel to the fifth and sixth cylinders during the refuel transition, wherein the fifth and sixth cylinders remain fully active during the refuel transition.

8. A method of output torque smoothing for a hybrid powertrain having an electric machine and a spark ignition engine with a first cylinder and a second cylinder, wherein the spark ignition engine is capable of operating with an optimal spark advance and a targeted spark advance configured to produce smooth output torque due to a spark retard, the method comprising:
commanding a fuel-cut transition, including consecutively initiating and completing deactivation of the first cylinder and initiating and completing deactivation of the second cylinder;

supplying fuel to the first cylinder until the first cylinder completes deactivation and supplying fuel to the second cylinder until the second cylinder completes deactivation;
timing spark ignition for the first and second cylinders to a blended spark advance, wherein the blended spark advance is between the optimal spark advance and the targeted spark advance;
capturing a first excess torque from the first cylinder by generating electricity with the electric machine until the first cylinder completes deactivation, wherein the first excess torque is equal to the difference between torque from the first cylinder due to the blended spark advance and torque from the first cylinder due to the targeted spark advance; and
capturing a second excess torque from the second cylinder by generating electricity with the electric machine until the second cylinder completes deactivation, wherein the second excess torque is equal to the difference between torque from the second cylinder due to the blended spark advance and torque from the second cylinder due to the targeted spark advance.

9. The method of claim 8, wherein the spark ignition engine further includes a third cylinder and a fourth cylinder and the fuel-cut transition further includes consecutively initiating and completing deactivation of the third cylinder and then initiating and completing deactivation of the fourth cylinder, and further comprising:
supplying fuel to the third cylinder until the third cylinder completes deactivation and supplying fuel to the fourth cylinder until the fourth cylinder completes deactivation;
timing spark ignition for the third and fourth cylinders to the blended spark advance;
capturing a third excess torque from the third cylinder by generating electricity with the electric machine until the third cylinder completes deactivation, wherein the third excess torque is equal to the difference between torque from the third cylinder due to the blended spark advance and torque from the third cylinder due to the targeted spark advance; and
capturing a fourth excess torque from the fourth cylinder by generating electricity with the electric machine until the fourth cylinder completes deactivation, wherein the fourth excess torque is equal to the difference between torque from the fourth cylinder due to the blended spark advance and torque from the fourth cylinder due to the targeted spark advance.

10. The method of claim 9, further including maintaining substantially smooth torque output throughout the fuel-cut transition, such that an output torque profile of the hybrid transmission during the fuel-cut transition is characterized by the absence of inflection points.

* * * * *